Figure 1:
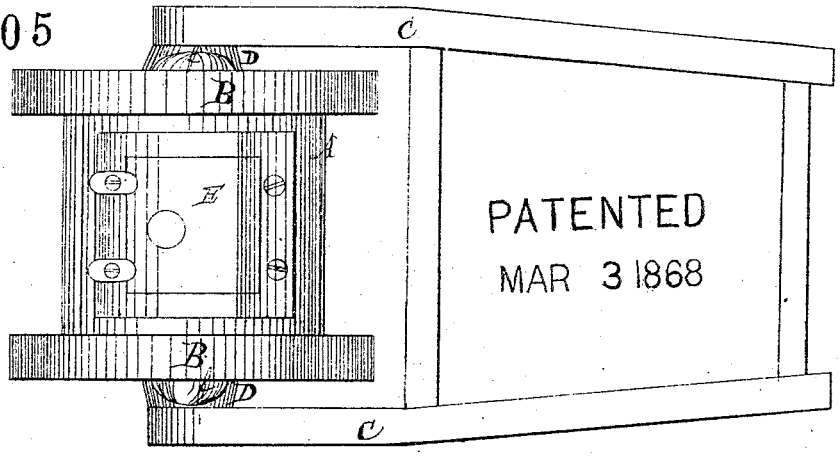
Figure 2:
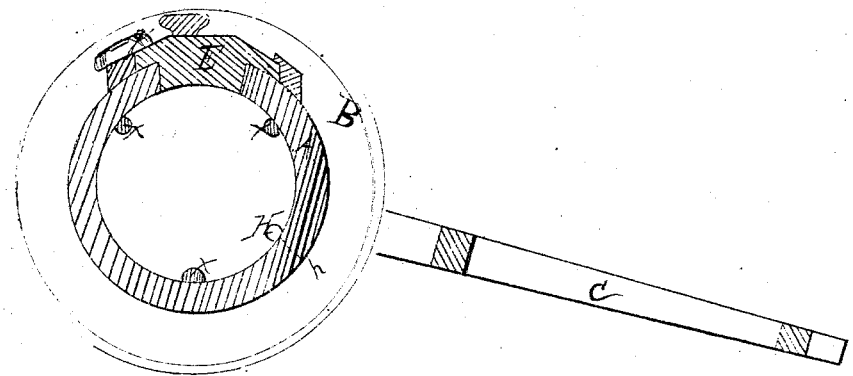

Shaw & Simmons
Reacting Churn

Witnesses
Cornelius Cox
V. D. Stockbridge

Shaw & Simmons
Inventors
Alexander & Mason
Atty.

United States Patent Office

B. W. SHAW AND GEORGE A. SIMMONS, OF MORRISTOWN, VERMONT.

Letters Patent No. 75,205, dated March 3, 1868.

IMPROVEMENT IN CHURNS.

*The Schedule referred to in these Letters-Patent and making part of the same.*

TO ALL WHOM IT MAY CONCERN:

Be it known that we, B. W. Shaw and George A. Simmons, of Morristown, in the county of Lamoille, and in the State of Vermont, have invented certain new and useful Improvements in Churns; and do hereby declare that the following is a full, clear, and exact description thereof, reference being had to the accompanying drawings and the letters of reference marked thereon.

In the annexed drawings, making part of this specification, A represents a hollow cylinder, made of any suitable dimensions and material, and having ribs or projections, $x\ x$, on the inside thereof. B B represent circular end-pieces, which close the ends of the cylinder A, and are as much larger in diameter as may be desired so as to form wheels or rollers for the same to run on. The wheels or ends B B are each furnished with journals D D, which work in journal-bearings in the ends of the arms C C, and thus furnish a suitable shaft or axle upon which the wheels B B and the cylinder A may turn. There are cleats, $f\ f$, also on the outside of said wheels B B, for the purpose of convenient handles to lift them by. Handles, C C, are adjusted outside of the wheels B B, and on the ends of the journals D D, in such manner as to be readily taken off or put on, as may be required. Said handles are fastened and supported by suitable cross-pieces framed into them. At one side of the cylinder A is an opening of suitable size, which is closed, at the option of the operator, by means of a bevelled slide or cap, E, which is held in its place by means of buttons $g$. At the bottom or the side opposite the hole at the top is a small hole, $h$, leading out through one of the ends B, for the purpose of allowing the buttermilk to run off after the butter is churned.

The cylinder A is designed as a cheap, convenient, and effectual churn. The cream is put inside through the door or opening, which is then closed by means of the cover or lid E, and then the operator takes hold of the handles, C C, and rolls the cylinder backward and forward on the floor, or table, or any plane surface. By this means the cream is dashed back and forth over the ribs $x$ and the sides of the cylinder A, and the whole mass equally agitated, and the butter all comes at the same time, and is therefore free from streaks of different colors.

Having thus fully described our invention, what we claim as new, and desire to secure by Letters Patent, is—

The combination of the cylinder A and the wheels B B, when constructed and operated substantially as and for the purpose herein set forth.

In testimony that we claim the foregoing, we have hereunto set our hands, this tenth day of January, 1868.

B. W. SHAW,
                         GEORGE A. SIMMONS.

Witnesses:
  J. H. Bennett,
  S. P. Hale.